Patented Dec. 12, 1933

1,939,491

UNITED STATES PATENT OFFICE 1,939,491

PROCESS FOR THE MANUFACTURE OF AROMATIC HYDROXY ALDEHYDES

Franz Elger, Basel, Switzerland, assignor to Hoffmann-La Roche Inc., Nutley, N. J., a corporation of New Jersey No Drawing. Application August 24, 1932, Serial No. 630,322, and in Germany August 24, 1931

1 Claim. (Cl. 260—136)

It is already known that iso-eugenol and other phenols, which in ortho- and para-position to the hydroxyl group contain a propenyl radical may be converted into the pertinent aldehydes by oxidation of their alkali salts with nitrobenzol in the presence of an excess of alkali and at higher temperature (Swiss Patent No. 132305).

These oxidations are carried out by heating the alkali salts in dry condition or in the presence of a small quantity of water or concentrated solution of potassium hydroxide with nitrobenzol to temperatures above 100° C. One must try to moderate and equalize the more or less violent reaction by stirring, by adding a large excess of nitrobenzol and by carefully watching the temperature, removing the source of heat at the beginning of the reaction, if necessary.

It has now been found that all these difficulties can be removed in a simple manner if such derivatives of aromatic nitro bodies are used, which, owing to their content in SO₃H or COOH groups, form water-soluble alkali salts. The reaction may then be carried out in aqueous, clear solution, without stirring, without a large excess of the nitro body, and it is not necessary to watch the reaction. Thus, it is sufficient to heat the alkaline solution of nitrobenzolsulpho-acid sodium and iso-eugenol sodium for some time in order to obtain vanilline with a very good yield.

Example 1

1200 parts of 10% solution of sodium hydroxide are poured over 164 parts of iso-eugenol and 240 parts of nitrobenzol-m-sulpho-acid sodium and heated. The heating is continued for 3 hours and the red-brown solution then acidified. The vanilline thus formed is taken up with ether and the etherous solution shaken with sodium-bisulphite solution. By decomposing the bisulphite solution with acid, 136 parts of vanilline of the melting point 78–79° C. are obtained, which may be completely purified by a single recrystallizing from water.

Example 2

42 parts of iso-eugenol, 70 parts of p-nitrobenzoic acid and 55 parts of caustic soda are dissolved in 800 parts of water and heated 6 hours with a reflux condenser. The vanilline is obtained in the same manner as described in Example 1.

Example 3

164 parts of iso-eugenol, 340 parts of 1-chloro-4-nitrobenzol-2-sulphonic acid and 160 parts of caustic soda are dissolved in 1500 parts of water and further treated as described in Example 1. Vanilline is obtained with a very good yield.

Example 4

89 parts of 2-hydroxy-3-propenylbenzoic acid are heated on the steam-bath for 4 hours with 150 parts of m-nitrobenzolsulpho-acid sodium, 500 cc. 20% solution of sodium hydroxide and 300 cc. water. The reaction product is then acidified, treated with ether and the 2-hydroxy-3-aldehyde-benzoic acid thus formed extracted from the ether with bisulphite solution. By decomposing the bisulphite solution with acid the 2-hydroxy-3-aldehyde-benzoic acid is obtained in almost white crystals of the melting point 174–176° C. By re-crystallization from water the melting point rises to 178–179° C.

I claim:

A process for the manufacture of aromatic hydroxy aldehydes which consists in heating, in alkaline solution, a substituted phenol selected from the group which consists of a phenol with a propenyl group in the ortho position and a phenol with a propenyl group in the para position with an oxidizing compound selected from the group which consists of nitro-benzoic acids and nitrobenzene sulphonic acids.

FRANZ ELGER.